June 3, 1930.    M. GORSKI    1,761,884
WATER VEHICLE
Filed April 16, 1929
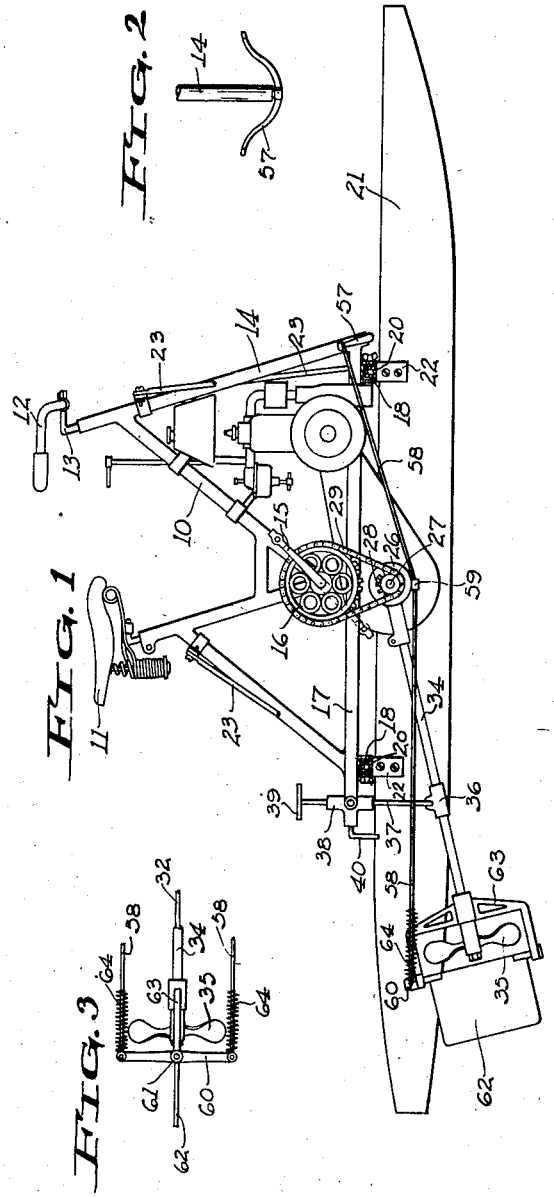
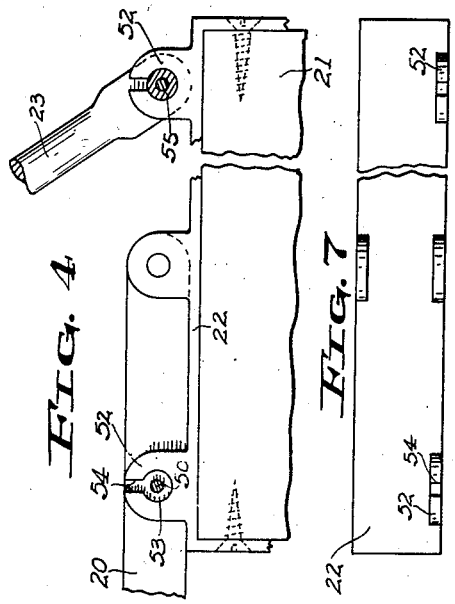
INVENTOR
Michael Gorski
By R. S. Caldwell
ATTORNEY
WITNESSES Patented June 3, 1930

1,761,884

UNITED STATES PATENT OFFICE

MICHAEL GORSKI, OF MILWAUKEE, WISCONSIN, ASSIGNOR TO BRINSMERE BOAT & CYCLE COMPANY, OF MILWAUKEE, WISCONSIN, A CORPORATION OF WISCONSIN

WATER VEHICLE

Application filed April 16, 1929. Serial No. 355,636.

This invention has for its object to provide a water vehicle in the nature of a floating velocipede, which may be impelled by the operation of pedals, but which is provided with a gas engine driving means capable of being cranked by the pedals.

An object of the invention is to provide for steering such a water vehicle by means of a rudder attached to the propeller carrier and mounted in the rear of the propeller.

Another object of the invention is to provide for ready connection and disconnection of parts without detachment of the connecting means.

Another object of the invention is to improve upon details of construction.

With the above and other objects in view the invention consists in the water vehicle as herein claimed and all equivalents.

Referring to the accompanying drawings, in which like characters of reference indicate the same parts in different views, Fig. 1 is a side elevation of a water vehicle constructed in accordance with this invention, the near pontoon having been removed;

Fig. 2 is a detail showing the cross arm on the steering post for operating the tillers;

Fig. 3 is a plan view of the propeller and rudder with tiller connections;

Fig. 4 is an enlarged view of one of the pontoon connections;

Fig. 5 is a detail view of the connection between one of the brace rods and the pontoon bracket with the parts disconnected;

Fig. 6 is a sectional view of one of the connections between the square swinging arms and the pontoon brackets, and Fig. 7 is a plan view of a pontoon bracket.

In these drawings, 10 indicates a tubular frame somewhat similar in construction to a bicycle frame having the usual saddle 11, handle bars 12 on a steering post 13 fitting in a steering head 14 and pedal cranks 15 with a sprocket wheel 16. On the bottom horizontal frame member 17, which connects the lower end of the steering head with the pedal bracket and seat post brace are a pair of supporting brackets 18 preferably brazed or welded on the bottom of said member, one being positioned near the steering head 14 and the other near the rear end of said member 17. Each of these supporting brackets 18 is of channel shape, and has pivotally mounted between its parallel flanged members a pair of swinging arms 20, preferably of square tubular construction. When extended these arms 20 fit within the brackets 18 and bear against the upper walls thereof to form a rigid supporting joint for supporting the weight of the vehicle frame and rider on a pair of pontoons 21 mounted on the outer ends of the arms.

The pontoons are preferably elongated floats of hollow sheet metal or of light wooden construction or of other material, and they have brackets 22 extending across them and down their sides, where they are rigidly secured by screws, said brackets being pivotally connected at the top of the pontoons with the ends of the swinging arms 20. Brace rods 23 are pivotally connected at their upper ends to the upper end of the steering head 14 and the upper end of the seat frame, and their lower ends are detachably clamped to the brackets 22.

When so connected the swinging arms 20 and the brace rods 23 with the brackets 22 form rigid lateral extensions of the frame construction with the pontoons 21 firmly and securely mounted at a distance from the center line to give great stability to the vehicle with its operator.

The detachable clamping means for the swinging arms 20 and the brace rods 23 whereby they are rigidly connected with the brackets 22 form a novel feature of this invention. A screw stud 50 is anchored in the end of the brace rod 23, or near the end of the swinging arm 20, and has a wing nut 51 threaded thereon but incapable of being removed because of the end of said stud being upset. The pontoon bracket 22 has an upstanding ear 52 for each of the studs 50 and said ear is provided with a central opening 53 with a smaller slot 54 leading thereto, the slot being of such a size as to admit the stud 50 to the opening. The wing nut 51 has a central flanged hub or projection 55 of a size to fit within the opening 50 but too large to pass through the slot 54. Thus when the wing nut is tightened its flanged hub or projection fits within said opening and, being incapable of passing through the slot, effectually locks the parts in their engagement. The wing nut, being incapable of removal from the stud, is incapable of being lost and is ready for use at all times. The detachment is quickly effected by backing the wing nut until the flanged hub or projection 55 is free from the opening 53, when the parts may be separated by the stud passing through the slot 54.

A yoked hanger bracket, not shown, is securely mounted on the frame member 17 beneath the crank shaft bearing and pivotally carries at its forked end a gear-case 26 having a shaft 27 extending therethrough with a sprocket 28 on the outside driven by a chain 29 from the sprocket wheel 16. A shaft tube 34 clamped to the gear-case 26 carries a shaft 32, on which is mounted a propeller 35, said shaft being driven by a gearing in the gear-case 26 from the shaft 27.

A gas engine 56 is mounted in the frame 10 and has driving connection through a chain and clutch, not shown, with the shaft 27 for driving the propeller and for being cranked by the turning of the pedal shaft, there being a ratchet connection permitting the pedals to remain idle while the engine drives the propeller. The clutch and ratchet construction form the subject-matter of a separate application.

The shaft tube 34, at about the middle of its length, is provided with a coupling 36 having a connecting rod 37 pivotally connected thereto. The connecting rod 37 slides through a swinging bearing 38 pivotally mounted on the rear end of the frame 10, a handle 39 being provided on the end thereof for raising or lowering the propeller shaft, and a clamping screw 40 being provided in the bearing for clamping the connecting rod in its adjustment. Thus the propeller shaft may be raised or lowered to bring the propeller between the pontoons or depressed to a greater or less extent and may be clamped in its adjustments. The steering post 13, which carries the handle bars 12, is provided at its lower end with a cross arm 57 and tiller cables 58 connected to the two ends thereof pass through guides 59 on the bottom of the gear-case 26 and extend to the opposite ends of a cross arm 60 on a rudder stem 61 of a rudder 62 pivotally mounted above and below in bearings formed by a rudder bracket 63 secured to the end of the shaft tube 34. Yielding connections such as springs 64 in the tiller cables 58 permit of sufficient extension and contraction thereof to accommodate the change in angular position of the propeller shaft.

With this invention the collapsible pontoon structure may be quickly and easily set up and securely locked in operative condition by means of the fastening mechanism provided and such fastening means is permanently attached and incapable of being lost. The invention provides for a collapsible pontoon with a propeller drive, which may be operated either manually or by the use of the gas engine. Nothwithstanding adjustability for the propeller shaft, provision is made for mounting the rudder in place thereon to be subject to the same adjustments therewith and to be operated by the turning of the handle-bar.

What I claim as new and desire to secure by Letters Patent is:

1. A water vehicle comprising a frame, arms mounted on the frame, pontoons pivotally mounted on the arms, brace rods detachably connecting the frame with the pontoons, and means for locking the arms and the brace rods to the pontoons comprising a bracket on said pontoons, slotted ears thereon having openings of larger diameter than the slots, screw studs on the arms and the brace rods capable of entering the openings by way of the slots, and thumb nuts on the screw studs having projections to enter said openings, said projections being too large to pass through the slots.

2. A water vehicle comprising a frame, arms mounted on the frame, pontoons pivotally mounted on the arms, brace rods detachably connecting the frame with the pontoons, and means for locking the arms and the brace rods to the pontoons comprising a bracket on said pontoons having the arms pivotally connected thereto, projecting ears on the bracket, screw studs on the arms and the brace rods respectively, there being slots in the ears through which screw studs may freely pass and openings of larger diameter than the slots communicating therewith, thumb-nuts threaded on the screw studs, heads on the screw studs preventing the removal of the thumb nuts, and flanged hub projections on the thumb nuts fitting within the openings of the ears and incapable of removal through the slots.

3. A water vehicle comprising a frame, arms mounted on the frame, pontoons pivotally mounted on the arms, brace rods detachably connecting the frame with the pontoons, steering and propelling means mounted on the frame, said detachable brace rods and arms permitting the pontoons to fold with respect to the frame, and a gas engine on the frame having driving connection with the propelling means.

4. A water vehicle comprising a frame in the nature of a bicycle frame having a saddle and a steering post with handle-bars, a pedal shaft having a sprocket, a propeller shaft, a gas engine mounted on the frame, driving means between the gas engine and the propeller shaft and between the sprocket and the propeller shaft and a rudder mounted on the propeller shaft and connected with the steering post.

5. A water vehicle comprising a frame in the nature of a bicycle frame having a saddle and a steering post with handle-bars, a pedal shaft having a sprocket, an adjustably mounted propeller shaft having driving connection with the sprocket, a rudder mounted on the propeller shaft behind the propeller thereof, and tiller cables having connection with the rudder and the handle-bars.

6. A water vehicle comprising a frame in the nature of a bicycle frame, having a saddle and a steering post with handle-bars, a pedal shaft having a sprocket, an adjustably mounted propeller shaft having driving connection with the sprocket, a rudder bracket mounted thereon, a rudder carried by the rudder bracket behind the propeller of the propeller shaft and having cross arms, cross arms on the lower end of the steering post, and tiller cables connecting the ends of the cross arms.

7. A water vehicle comprising a frame in the nature of a bicycle frame having a saddle and a steering post with handle-bars, a pedal shaft having a sprocket, a gear-case pivotally mounted on the frame, a propeller shaft tube carried by the gear-case, a propeller shaft therein having a propeller on its end, driving means between the sprocket and the propeller shaft, means for raising and lowering the propeller shaft tube, rudder brackets on the propeller shaft tube, a rudder mounted therein behind the propeller and having cross arms, cross arms on the end of the steering post, and tiller cables guided on the gear-case and connecting the ends of the cross arms.

In testimony whereof, I affix my signature.

MICHAEL GORSKI.